Wm C. Dodge
Metallic Cartridge-Case.
No. 3548. Reissued July 13, 1869.
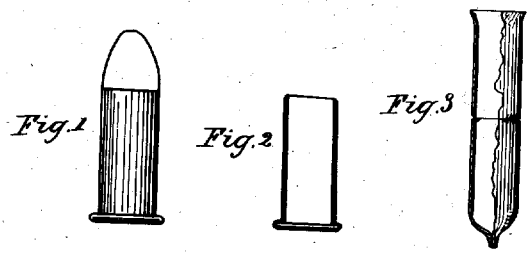
Witnesses
J. D. Willoughby
James Lee
Inventor
W. C. Dodge

UNITED STATES PATENT OFFICE.

WILLIAM C. DODGE, OF WASHINGTON, DISTRICT OF COLUMBIA.

IMPROVEMENT IN METALLIC CARTRIDGE-CASE.

*Specification forming part of Letters Patent No.* 48,536, *dated July* 4, 1865; *reissue No.* 3,548, *dated July* 13, 1869.

*To all whom it may concern:*

Be it known that I, WILLIAM C. DODGE, of Washington city, in the District of Columbia, have invented new and useful Improvements in Constructing Metallic Cartridges for Fire-Arms; and I do hereby declare that the following is a full, clear, and exact description thereof, reference being had to the accompanying drawings, making part of this specification.

My invention relates to an improvement in what are known as metallic cartridges for fire-arms; and the invention consists in coating the metallic portions, in whole or in part, with tin or other metal, or alloy of metals, less liable to oxidize than the metallic portions of the cartridge themselves are.

In making metallic cartridges, so called, it is desirable to inclose the fulminate, powder, and lubricant all within the metallic case, and then to so unite the case to the ball as to render the case tight, or water-proof, in order to preserve the ammunition, thus prepared, from injury by becoming wet, either during storage, transportation, or use. Experience, however, has demonstrated the fact that when this is done the cartridge is liable to become injured, more or less, by the oxidation or corrosion of the metallic portions. This corrosion may result from either or all of the three following-named causes: First, from the effect of the fulminate upon the parts with which it comes in contact; second, from the effects of the grease or material used for lubricating purposes, which affects both the case and the ball in some instances, and in others only one; third, from the effect of moisture. By these causes, acting either separately or combined, the ammunition is liable to deteriorate in value, and ultimately to become utterly useless, especially when stored for a length of time, particularly in warm or moist climates.

To prevent these evils, I coat the metallic portions of the cartridge with tin or any similar metal, or alloy of metals, that will not oxidize or corrode as readily as the metal of the cartridge. This may be done in a variety of ways, but the simplest plan is to immerse the shell in molten tin, after being suitably cleaned, and thus coating it with tin over its entire surface, after the plan adopted in what is known as the process of tinning metallic plates.

Figure 1 represents a metallic cartridge complete, of the kind known as rim-fire cartridge. Fig. 2 is a vertical section of the shell of the same, tinned internally; and Fig. 3 is a view of a shell, known as central-fire, with a portion broken away, to exhibit the tinning on its interior.

In the manufacture of these cartridge-shells, it is customary to make them of copper or brass, by cutting the blanks, in the form of a flat disk, out of sheet metal, and drawing them up into the form of a cup or tube, with one end closed, by forcing them repeatedly through dies, each successive die being of less diameter than the preceding one. This process hardens the metal, and renders it brittle and liable to crack; and it therefore becomes necessary to anneal the cases one or more times during the operation. In such cases the tinning cannot be done until after the last heating, as it is obvious that if done before, the annealing would melt the tin all off. If it be desired to make very small cartridges, and which may be made without annealing, the tinning may be performed upon the sheet previous to punching out the disks; but, in such case, it is obvious that the operation would not be as complete, for the reasons that the edge of the disk or of the case would have no tin on it, and besides there would be danger of fracturing or scraping off the coating of tin, by forcing the metal through the dies. It is, therefore, better in all cases to apply the tin to the shell or case after it is formed.

In making the rim-fire cartridges, such as are represented in Figs. 1 and 2, the tinning must be done previous to forming the head or flange on the shell, which is usually the last step in forming it; because, if applied after the flange is formed, the tin will fill up the cavity in the flange, and then the fulminate cannot be inserted in said cavity.

As, however, the forming of the head or flange is liable to crack the metal where the flange is doubled over, thus rendering such cartridges liable to burst, and also to have the head pulled off, in the effort to withdraw them from the gun after being fired, the central-fire style is preferred; and as in these the fulminate is located at the center, and not in the cavity of the rim, the tinning of this style is best performed after the flange has been made.

In such cases the tin will fill up the cavity within the flange, thus rendering the flange or rim solid, and thereby filling or soldering up all cracks or cavities, and greatly strengthening or re-enforcing the head of the shell.

It is also obvious that by thus tinning the case, all cracks that may exist in any part of the same will be filled or soldered up, and the whole rendered solid and strong, and the case be thus greatly improved and strengthened.

While I prefer tin for coating the cases, it is obvious that other metals, or alloys of metals, may be used for this purpose, and that gold, silver, and similar metals may be used, and may be applied by the well-known galvanic process; still I prefer tin, as being the cheapest and simplest.

Having thus described my invention, what I claim, is—

A cartridge-case for fire-arms, composed of ductile metal, and coated or plated internally or externally, or both internally and externally, with tin or other suitable metals, or alloy of metals, substantially as and for the purposes herein set forth.

WILLIAM C. DODGE.

Witnesses:
EMMETT QUINN,
CHAS. H. KELLER.